United States Patent
Penttila et al.

(10) Patent No.: US 9,148,497 B2
(45) Date of Patent: Sep. 29, 2015

(54) DISPLAY WITH IMPROVED ELECTROMAGNETIC COMPATIBILITY CHARACTERISTICS

(75) Inventors: Jani E. Penttila, Lempaala (FI); Marko K. Heikkinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 854 days.

(21) Appl. No.: 12/386,790

(22) Filed: Apr. 22, 2009

(65) Prior Publication Data
US 2010/0271292 A1  Oct. 28, 2010

(51) Int. Cl.
*G09G 3/30* (2006.01)
*H04M 1/02* (2006.01)

(52) U.S. Cl.
CPC ..................... *H04M 1/026* (2013.01)

(58) Field of Classification Search
CPC .............................. G06F 1/1656; H01Q 1/243
USPC ............. 345/102, 76; 349/150–153; 257/776; 323/355
See application file for complete search history.

(56) References Cited

U.S. PATENT DOCUMENTS

| | | | |
|---|---|---|---|
| 6,370,019 B1* | 4/2002 | Matthies et al. | 361/679.22 |
| 6,680,723 B2* | 1/2004 | Oda et al. | 345/102 |
| 6,778,139 B2* | 8/2004 | Suzuki et al. | 343/700 MS |
| 7,223,007 B1 | 5/2007 | Fredley et al. | 362/616 |
| 7,557,451 B2* | 7/2009 | Shinojima | 257/776 |
| 7,657,025 B2* | 2/2010 | Hsu et al. | 379/429 |
| 7,885,403 B2* | 2/2011 | Fuhrmann et al. | 379/433.11 |
| 8,599,149 B2* | 12/2013 | Lee et al. | 345/173 |
| 2003/0175454 A1* | 9/2003 | Lichtenstein et al. | 428/35.7 |
| 2005/0190333 A1* | 9/2005 | Wu et al. | 349/150 |
| 2007/0242055 A1* | 10/2007 | Lai | 345/173 |
| 2009/0163147 A1* | 6/2009 | Steigerwald et al. | 455/73 |

* cited by examiner

*Primary Examiner* — Quan-Zhen Wang
*Assistant Examiner* — Calvin C Ma
(74) *Attorney, Agent, or Firm* — Harrington & Smith (57) ABSTRACT

Disclosed herein is an apparatus. The apparatus includes a display module having a base member, an emissive component, and a flexible circuit. The flexible circuit includes a first end and an opposite second end. The base member is proximate the first end. The emissive component is mounted on the second end. The second end of the flexible circuit is disposed between the base member and the emissive component.

20 Claims, 7 Drawing Sheets

DISPLAY WITH IMPROVED ELECTROMAGNETIC COMPATIBILITY CHARACTERISTICS

BACKGROUND

1. Field of the Invention

The invention relates to a display and, more particularly, to a display having improved electromagnetic compatibility characteristics.

2. Brief Description of Prior Developments

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Some conventional display configurations are known to suffer from various electromagnetic interference (EMI) issues. For example, some configurations include a high-power power supply (meaning a power supply with high power) near the display module and provide relatively inexpensive flexible circuits and a limited amount of components. This tends to cause electromagnetic compatibility (EMC) problems as there is generally limited capability to solve the EMC issues with good design and component selections.

Additionally, achieving satisfactory EMC performance in some electronic device displays can be problematic as the display emission can cause a lack of radio frequency (RF) sensitivity in different handset radios (such as GPS, BT, GSM, and NFC for example). This may then affect operator approval, authority (type) approval and/or the quality of the end product.

Furthermore, some display types, such as organic light emitting diode (OLED) displays are being introduced into the mass market. This is increasing the risks for EMI issues. To some extent, EMI issues have hindered reducing the display cost, thus slowing down the speed to mass market introduction.

SUMMARY

The foregoing and other problems are overcome, and other advantages are realized, by the use of the exemplary embodiments of this invention.

In accordance with one aspect of the invention, an apparatus is disclosed. The apparatus includes a display module having a base member, an emissive component, and a flexible circuit. The flexible circuit includes a first end and an opposite second end. The base member is proximate the first end. The emissive component is mounted on the second end. The second end of the flexible circuit is disposed between the base member and the emissive component.

In accordance with another aspect of the invention, an apparatus is disclosed. The apparatus includes a base member, an emissive component, a flexible circuit, and a conductive cushion. The base member has a first side and an opposite second side. The first side is configured to support a display structure. The emissive component is proximate the second side of the base member. The flexible circuit extends between the base member and the emissive component. The emissive component is on the flexible circuit. The conductive cushion surroundings the emissive component. The conductive cushion is connected to the flexible circuit.

In accordance with another aspect of the invention, a method is disclosed. A base member having a first side and a second side is provided. The first side is configured to support a display structure. The second side is opposite the first side. A flexible circuit is connected to the base member. A first end of the flexible circuit is proximate the first side of the base member. A second end of the flexible circuit is proximate the second side of the base member. An emissive component is connected to the flexible circuit. At least a portion of the flexible circuit is between the emissive component and the second side of the base member.

In accordance with another aspect of the invention, a method is disclosed. A base member having a first side and an opposite second side is provided. The first side is configured to support a display structure. An emissive component is provided proximate the second side of the base member. A flexible circuit is connected between the base member and the emissive component. The emissive component is on the flexible circuit. A conductive cushion is connected to the flexible circuit. The conductive cushion forms a surrounding wall around the emissive component.

BRIEF DESCRIPTION OF THE DRAWINGS

The foregoing aspects and other features of the invention are explained in the following description, taken in connection with the accompanying drawings, wherein.

DETAILED DESCRIPTION

Figure 1:
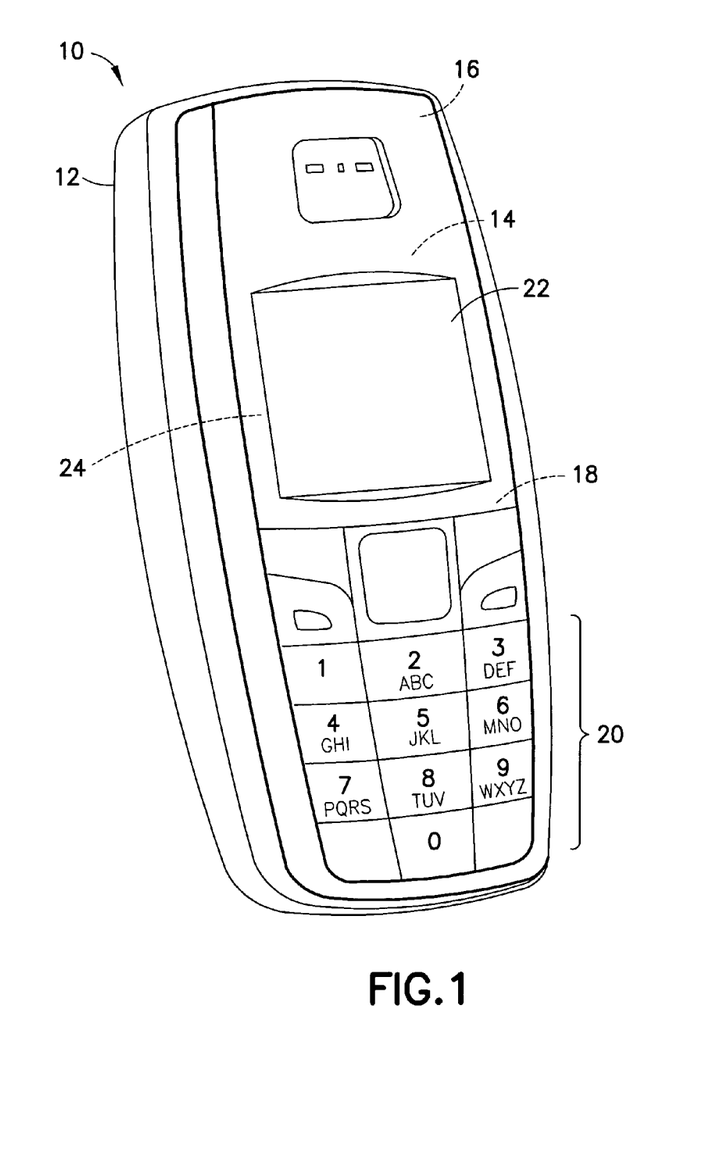
FIG. 1 is a perspective view of an electronic device incorporating features of the invention.

Referring to FIG. 1, there is shown a perspective view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of portable electronic device such as a mobile phone, a gaming device, a music player, a notebook computer, or a PDA, for example. In addition, as is known in the art, the device 10 can include multiple features or applications such as a camera, a music player, a game player, or an Internet browser, for example. The device 10 generally comprises a housing 12, a transceiver 14 connected to an antenna 16, electronic circuitry 18, such as a controller and a memory for example, within the housing 12, a user input region 20 and a display 22. The display 22 could also form a user input section, such as a touch screen. It should be noted that in alternate embodiments, the device 10 can have any suitable type of features as known in the art.

The electronic device 10 further comprises a display module 24. According to various exemplary embodiments of the invention, the display module may be an organic light emitting diode (OLED) display module. Additionally, according to some embodiments of the invention, the OLED display module may be an active matrix (AM) OLED. However, any suitable type of display module may be provided, such as a liquid crystal display (LCD) display module, for example.

Figure 2:
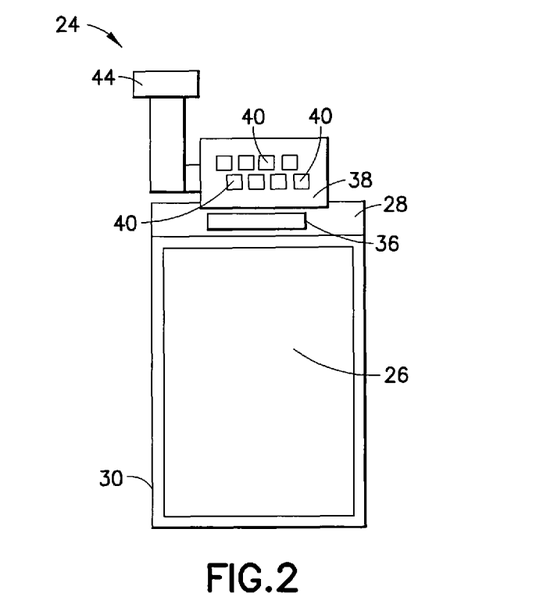
FIG. 2 is a top plan view of a display module used in the device shown in FIG. 1.
Figure 3:
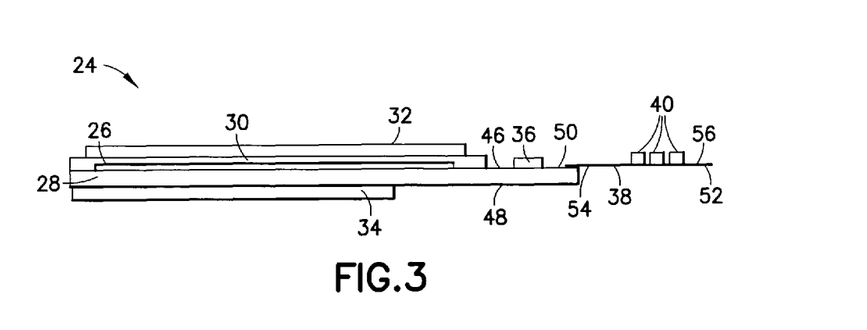
FIG. 3 is a side view of the display module shown in FIG. 2.
Figure 4:
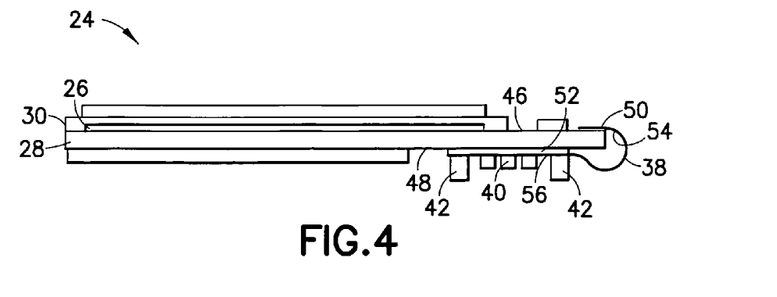
FIG. 4 is a side view of the display module shown in FIG. 2 with a flexible circuit bent under the display.

Referring now also to FIGS. 2-4, the OLED display module comprises a display structure 26, a base member 28, a top member 30, a polarizer 32, a supportive structure 34, a display integrated circuit (IC) 36, a flexible circuit 38, electrical components 40, a conductive cushion 42, and an electrical connection 44. The display module 24 is configured to provide a viewable image to a user of the device 10 at the display screen 22. However, the display module 24 may provide a viewable image at any other suitable location of the device 10, such as on a back side (or back face) of the device 10 for example.

The display structure (or display active area) 26, which may be an OLED display structure for example, generally comprises layers of organic materials (which make up the OLED's light emissive components). The light emissive components emit the colored (red, green, blue, or white) light which is viewable on the display screen 22. According to some embodiments of the invention, a backlight structure is not required. However, any suitable configuration may be provided.

The base member 28 is below the display structure 26. The base member 28 comprises a first side 46 and an opposite second side 48. The base member 28 may be a glass member which supports the display structure 26. Additionally, the display structure 26 may be deposited or built on the first side 46 of the base member 28. However, any suitable material, configuration, and/or fabrication method may be provided.

The top member 30 is disposed on the base member 28. The top member 30 may be a glass member which capsulates (or covers) the display structure 26. According to some embodiments of the invention, the top member 30 significantly increases the life of the display structure 26 by minimizing or preventing air from reaching (or contacting) the display structure 26. However, any suitable material and/or configuration maybe provided.

The polarizer 32 is generally mounted on the top member 30. According to some embodiments of the invention, the polarizer 32 may provide for optical enhancement of the emitted light from the display module 24. However, the polarizer 32 is not required for the OLED display 24 to function, and any suitable configuration may be provided.

The supportive structure 34 is below the base member 28 and provides support for the display module 26. However, it should be noted that the supportive structure 34 is not required for the OLED display 24 to function, and any suitable configuration may be provided.

In the embodiments shown in the figures, the display integrated circuit (IC) 36 is mounted on the base member 28. In other embodiments, the display IC 36 may be mounted or connected to the flexible circuit or any other suitable location of the display module 24 or device 10.

The flexible circuit 28 comprises a first end 50, a second end 52, a first side 54 and a second side 56. The flexible circuit 28 may be a flexible printed circuit (FPC) or flexible flat conductor (FFC) cable, a flexible printed wiring board (PWB), or flexible printed circuit board (PCB), for example, however any suitable type of circuit/cable may be provided. In the embodiment shown in the figures, the flex circuit, or flex, 38 may be connected to the display glass (or base member) 28. In other embodiments, the flex 38 may be connected to any suitable portion or component of the display module 24.

Figure 5:
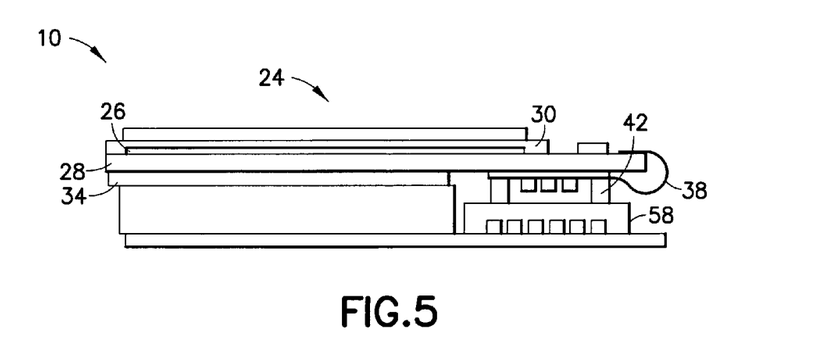
FIG. 5 is a partial section view of the device shown in FIG. 1.

In FIGS. 2, 3 the flex 38 is illustrated in a straight (or unbent) condition. The straight condition may be an intermediate assembly configuration, such as prior to installing or mounting in the housing 12, for example. In FIG. 4, the flex 38 is illustrated as bent under the display 24. The bent condition may be another intermediate assembly configuration, such as in preparation for installing or mounting in the housing 12, for example. For example in the bent condition (or installation condition), a first side 54 of the flexible circuit 38 may be connected to the first side 46 of the base member 28 (at the first end 50 of the flex 38), and the first side 54 of the flex 38 may be at the second side 48 of the base member 28 (proximate the second end 52 of the flex 38). However, any suitable configuration may be provided. In FIG. 5, the display module 24 is shown as installed/mounted (or integrated) within the handset wherein the flex 38 is bent under the display 24. According to some embodiments, bending of the flex 38 under the display may save space, in a lengthwise orientation, within the housing 12 of the device 10. However, it should be noted that according to various embodiments of the invention, the flex 38 may be provided within the housing in any suitable configuration, such as straight or partially bent, for example.

The electrical components 40 may be mounted on the flexible circuit 38. The electrical components 40 may include a (high power) power supply. However, any suitable electrical components may be provided. As shown in FIGS. 3-5, the electrical components 40 may be mounted on the second side 54 of the flexible circuit 38 such that the flexible circuit 38 is between the electrical components 40 and the base member 28. It should be noted however, that any suitable configuration may be provided, such as the electrical components 40 mounted on the first side 54 of the flexible circuit 38. It should further be understood that although the figures illustrate several components, any suitable number of components may be provided.

The conductive cushion 42 surrounds the electrical components 40 and is mounted on the second side 56 of the flexible circuit 38. Additionally, the conductive cushion 38 may be connected to a flex ground. However, the conductive cushion 42 may be connected to any suitable display module ground. According to one embodiment, the flexible circuit 38 may comprise a cover layer opening at a ground plane for providing a connection to the conductive cushion 42. However, any suitable type of connection/orientation may be provided. It is to be noted that the conductive cushion may be any suitable type of compressible conductive material and/or structure.

The electrical connection 44 is configured for providing voltages and driving the OLED display module 24 for proper operation. The electrical connection 44 may be any suitable type of electrical connector for electrically coupling the display module 24 to the device 10. In the embodiment shown in FIG. 2, the electrical connection is connected to the flex 38. In alternate embodiments, the electrical connection may be connected at any suitable location.

According to various exemplary embodiments of the invention, improved electromagnetic compatibility performance (in mobile displays and handsets, for example) may be achieved. For example, one or more of the electrical components 40 (on the OLED module flex 38) may be problematic electrically emissive components, wherein electromagnetic compatibility (EMC) shielding may improve performance of the display 24 and/or the device 10. Without any type of shielding configuration, the electrical emission from the components 40 may cause radio frequency (RF) related problems in the handset, for example. Generally, the OLED glass (the top glass member 30 and/or the base member 28) may not work as a shield against the emissions from the components 40. However, in the embodiment shown in figures (for example see FIGS. 4 and 5), having the flex ground plane of the flexible circuit 38 oriented towards the display glass (or substrate) 28 acts as a shield for decreasing emission through the glass.

Figure 6:
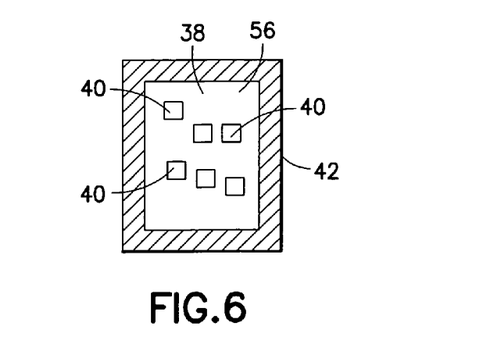
FIG. 6 is an enlarged view of electrical components and conductive cushion used in the device shown in FIG. 1.

Additionally, adding the conductive material around the component 40 area works as walls for the shield (for example, see the form of the conductive cushion 42 in FIG. 6). It should be noted that the conductive cushion 42 is not required to take the form illustrated in FIG. 6, and any suitable shape or conductive material may be provided. Additionally, the conductive cushion (or other conductive material) 42 may be located either on the display module 24 or on the handset 10 side.

The conductive cushion 42 around the component 40 area may work as a shielding configuration together with handset side metallic surface(s). For example, according to some embodiments of the invention, the handset side metallic surface(s) may be any suitable metal structure inside the handset such as a shielding can (or cans) 58 (see FIG. 5) used for shielding components on the phone engine PWB, a metallic bottom plate of the device, or some other grounded metal part of device/handset 10, for example. However, it should be noted that a separate shielding can or structure is not required. For example, in some embodiments of the invention, when the conductive material is pressed in against a metal/conductive surface of handset, the conductive parts in together with the handset metal structure form a faraday cage that acts as similar way as a shielding can. However, any suitable configuration may be provided.

Various exemplary embodiments of the invention provide for improved configurations (in terms of handset EMC performance) when compared to conventional designs having problematic electrical components such as hi-power power supplies which are electrically emissive, use costly additional shielding components, and/or use special noise reduction circuits. The technical effects of any one or more of the exemplary embodiments of the invention provide for integrating thin OLED displays with improved EMC characteristics. However, it should be noted that the technical effects of any one or more of the exemplary embodiments of the invention may provide for integrating any suitable type display, such as LCD displays suffering from certain electromagnetic interference (EMI) issues, for example.

Additionally, various exemplary examples of the invention provide for improved shielding configurations when compared to conventional configurations having components facing against the glass, which may cause emissions through the display glass.

Figure 7:
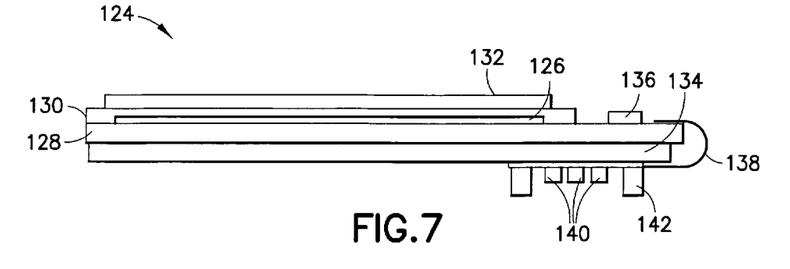
FIG. 7 is a side view of a display module in accordance with another exemplary embodiment used in the device shown in FIG. 1.
Figure 8:
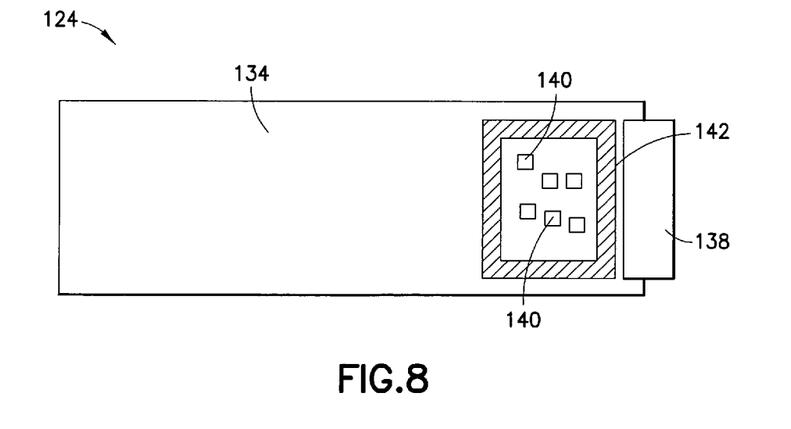
FIG. 8 is a bottom plan view of the display module shown in FIG. 7.

Referring now also to FIGS. 7, 8 there is shown a display module 124 in accordance with another embodiment of the invention. Similar to the display module 24, the display module 124 comprises a display structure 126, a base member 128, a top member 130, a polarizer 132, a display integrated circuit (IC) 136, a flexible circuit 138, electrical components 140, a conductive cushion 142, and an electrical connection (not shown). However, in this embodiment the display module 124 includes an extended supportive structure 134. As shown in FIGS. 7, 8, the supportive structure 134 on the OLED module 124 may be enlarged such that it extends between the flex 138 and the glass 128.

Similar to the display module 24, the display module 124 comprises the conductive cushion 142 around the component 140 area. Also similarly, the conductive cushion 142 may be provided on the handset side, and the cushion 142 may then be connected to the pads on display flex 138 when display 124 is assembled to handset 10.

Additionally, it should be noted that although the display module 24 comprises the supportive structure 34, and the display module 124 comprises the supportive structure 134, the supportive structure is not required and the OLED module 24, 124 can be provided without a supportive structure.

Similar to the display module 24, the display module 124 includes a solid ground (or hatched ground layer) on the flex 138 which provides for an improved configuration for shielding the RF related emissions from the electrical components 140 on the flexible circuit 138. The technical effects of any one or more of the exemplary embodiments of the invention provide for improved shielding when compared to conventional configurations having an "un-solid" ground on the flex 138.

Figure 9:
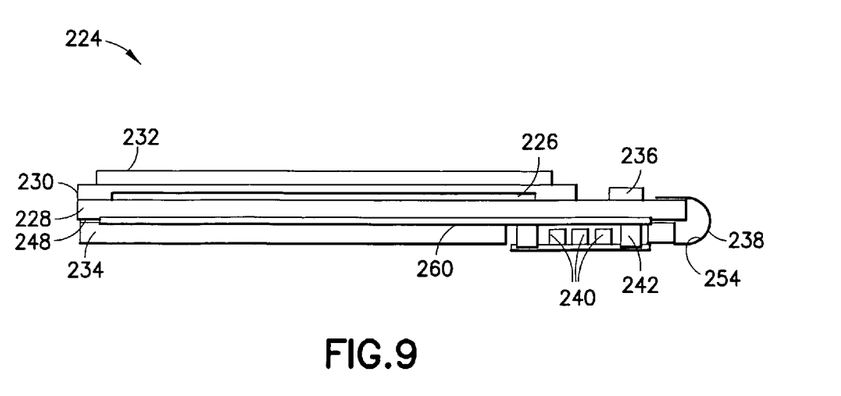
FIG. 9 is a side view of a display module in accordance with another exemplary embodiment used in the device shown in FIG. 1.

Referring now also to FIG. 9, there is shown a display module 224 in accordance with another embodiment of the invention. Similar to the display module 24, 124, the display module 224 comprises a display structure 226, a base member 228, a top member 230, a polarizer 232, a supportive structure 234, a display integrated circuit (IC) 236, a flexible circuit 238, electrical components 240, a conductive cushion 242, and an electrical connection (not shown). However, in this embodiment the display module 224 includes the electrical components 240 and the conductive cushion 242 on the first side 254 of the flexible circuit 238. Additionally, the display module 224 further comprises a conductive surface/film 260 on the second side 248 of the base member 228.

As shown in FIG. 9, the display electrical components 240 on the flex 238 may face towards the glass 228. In this configuration wherein the electrical components 240 are between the flex 238 and the base member 228, the flex 238 faces towards a display back/bottom side and acts as a shield to the back/bottom side direction (or a direction away from the polarizer 232). The solid ground on the flex 238 may decrease electrical emissions through the flex 238.

Similar to the display module 24, 124, the display module 224 comprises a conductive cushion (or other conductive material) 242 around the emittive components 240 on the display flex 238. The conductive cushion 242 may be connected to display modules ground (or a flex ground plane). Also similar to the display module 24, 124, a ground plane of the display flexible PWB 238 may have a cover layer opening to provide the connection to the conductive cushion 242.

The thin conductive surface/film 260 also provides shielding for the display module 224. The conductive surface/film 260 on the back/bottom of the display glass 228 may be a thin layer of conductive adhesive, a metallic surface, or a metalized glass surface, for example. However, any suitable conductive surface/film may be provided. The layer size can be minimized to cover only the component area, or cover the backside of the display panel. However, any suitable layer size may be provided. The conductive surface/film 260 can be also connected electrically to the module supportive structure.

Additionally, the conductive cushion 242 around the component 240 area may also work as shielding together with metallic surface 260 on the back of the module 224. The cushion 242, flex 238 ground, and the metallic surface 260 may all be connected electrically. However, any suitable configuration may be provided.

Similar to above, the technical effects of any one or more of the exemplary embodiments of the invention provide an improved configuration including, for example, a solid ground on the flex 38, 138, 238 which decreases the problematic electrical emissions through the glass 28, 128, 228, 30, 130, 230 (when compared to conventional configurations).

Figure 10:
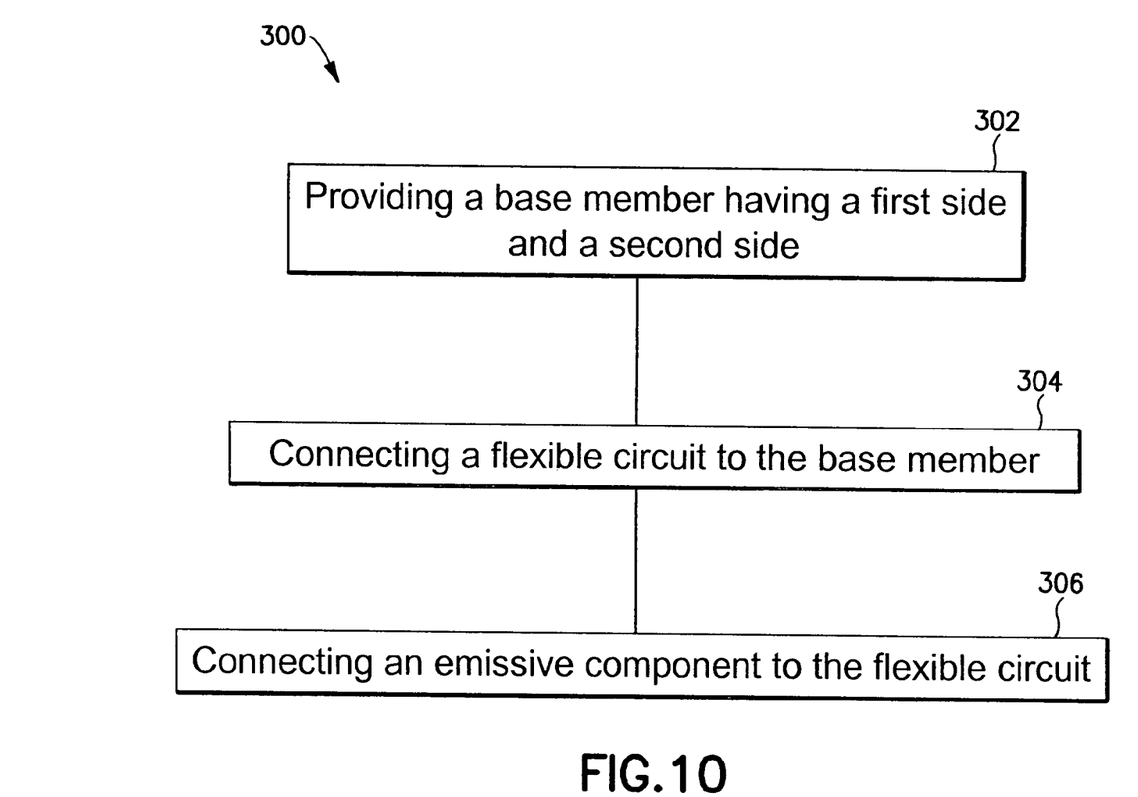
FIG. 10 is a block diagram of an exemplary method of the device shown in FIG. 1.

FIG. 10 illustrates a method 300. The method 300 includes the following steps. Providing a base member having a first side and a second side, wherein the first side is configured to support a display structure, and wherein the second side is opposite the first side (step 302). Connecting a flexible circuit to the base member, wherein a first end of the flexible circuit is proximate the first side of the base member, and wherein a second end of the flexible circuit is proximate the second side of the base member (step 304). Connecting an emissive component to the flexible circuit, wherein at least a portion of the flexible circuit is between the emissive component and the second side of the base member (step 306). It should be noted that any of the above steps may be performed alone or in combination with one or more of the steps.

Figure 11:
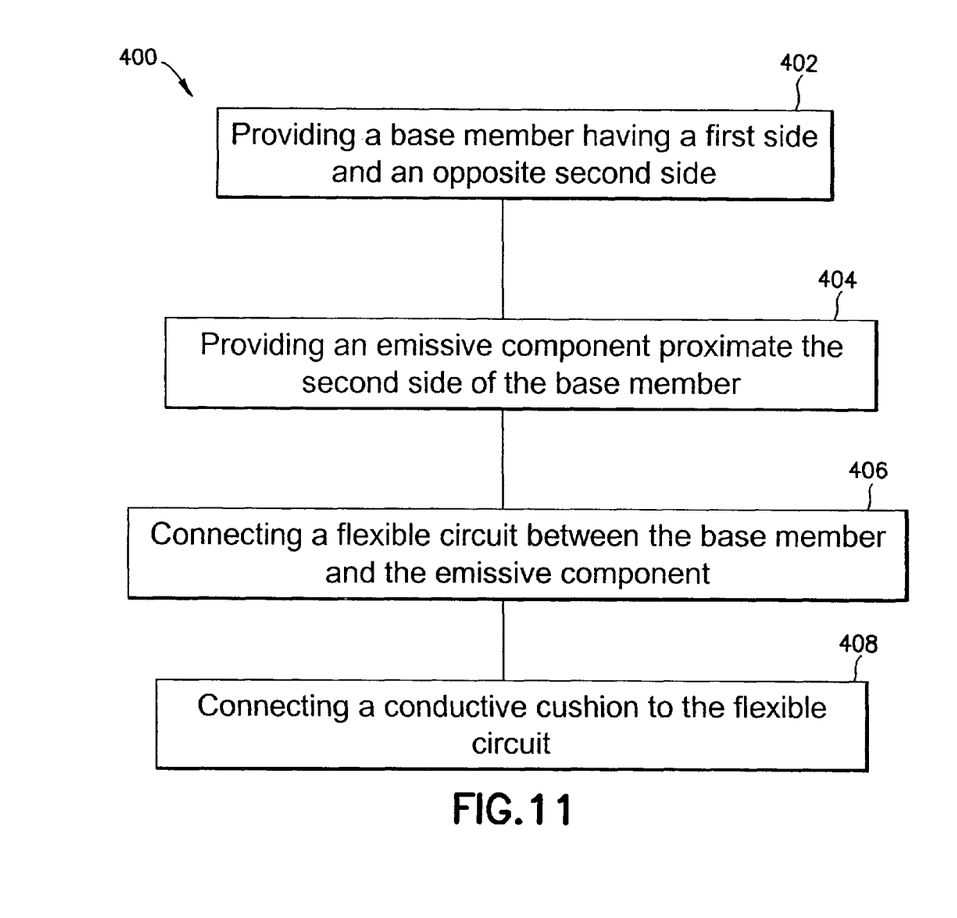
FIG. 11 is a block diagram of another exemplary method of the device shown in FIG. 1.

FIG. 11 illustrates a method 400. The method 400 includes the following steps. Providing a base member having a first side and an opposite second side, wherein the first side is configured to support a display structure (step 402). Providing an emissive component proximate the second side of the base member (step 404). Connecting a flexible circuit between the base member and the emissive component, wherein the emissive component is on the flexible circuit (step 406). Connecting a conductive cushion to the flexible circuit, wherein the conductive cushion forms a surrounding wall around the emissive component (step 408). It should be noted that any of the above steps may be performed alone or in combination with one or more of the steps.

While various embodiments of the invention have been described in connection with OLED displays and power supply components, one skilled in the art will appreciate that the invention is not necessarily so limited and that any suitable type of display/component technology may be provided.

Figure 12:
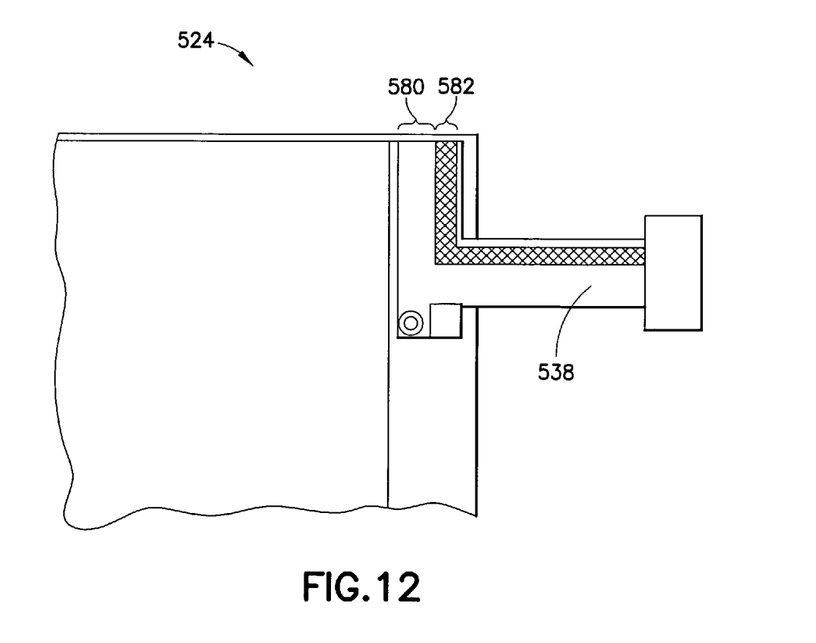
FIG. 12 is a partial top view of a display module in accordance with another exemplary embodiment used in the device shown in FIG. 1.

While various exemplary embodiments have been described in connection with a solid ground, it should be noted that any suitable ground may be provided. Referring now also to FIG. 12, there is shown a display module 524 in accordance with another embodiment of the invention. The display module 524 is similar to the display module 24, 124, 224. However, one difference may be that the display module 524 comprises a flexible circuit 538 having a solid (see area 580) and hatched (see area 582) ground. One skilled in the art will appreciate that in some cases, the hatched ground can be as effective as a purely solid ground layer when provided in a suitable configuration. It should further be noted that although the figures illustrate flexible circuits having either a solid ground or a solid and hatched ground, any suitable ground layer configuration may be provided. For example, some examples of the invention may comprise an entirely hatched ground (or hatched non-solid ground).

Various exemplary examples of the invention provide for improved shielding configurations when compared to conventional configurations having: additional components or multilayer PWB in the OLED module to decrease EMI; OLED power supply designed in an inefficient way to smooth and/or remove harmonic frequencies emitted by circuit (which may add cost and size of the implementation); and/or metalized "shielding structure" around noisy components to block the emissions.

The technical effects of any one or more of the exemplary embodiments of the invention provide for significant advantages (over conventional configurations) such as: improved display EMC performance (which may be, for example, to substantially the same level it would be with a shielding can type configuration); improved display ground contact (which reduces risk of electrostatic discharge [ESD] damage); and/or thinner overall handset/device configurations (such as by removing shielding can components).

It should further be noted that various provisions/considerations for mechanical loads to the display and/or glass breakage risks may be made for some examples of the invention which may include shielding gaskets. Also, provisions/considerations for a flex bending radius and/or product specific antenna tuning may be made.

According to one example of the invention, an apparatus is disclosed. The apparatus includes a display module having a base member, an emissive component, and a flexible circuit. The flexible circuit includes a first end and an opposite second end. The base member is proximate the first end. The emissive component is mounted on the second end. The second end of the flexible circuit is disposed between the base member and the emissive component.

According to one example of the invention, an apparatus is disclosed. The apparatus includes a base member, an emissive component, a flexible circuit, and a conductive cushion. The base member has a first side and an opposite second side. The first side is configured to support a display structure. The emissive component is proximate the second side of the base member. The flexible circuit extends between the base member and the emissive component. The emissive component is on the flexible circuit. The conductive cushion surroundings the emissive component. The conductive cushion is connected to the flexible circuit.

It should be understood that components of the invention can be operationally coupled or connected and that any number or combination of intervening elements can exist (including no intervening elements). The connections can be direct or indirect and additionally there can merely be a functional relationship between components.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising a display module having a base member, an emissive component, and a flexible circuit, wherein the flexible circuit comprises a first end and an opposite second end, wherein the base member is proximate the first end, wherein the emissive component is an electrically emissive electrical component, wherein the emissive component is mounted on the flexible circuit proximate the second end, wherein the second end of the flexible circuit is disposed between the base member and the emissive component, wherein the first end of the flexible circuit is electrically connected to the display module of the apparatus, wherein the second end of the flexible circuit is configured to be electrically connected to a portion of the apparatus separate from the display module, and wherein the flexible circuit is configured to shield radio frequency (RF) related emissions from the electrically emissive electrical component.

2. An apparatus as in claim 1 wherein the display module is an organic light emitting diode (OLED) display module, and wherein the flexible circuit configured to shield radio frequency (RF) related emissions from the electrically emissive electrical component comprises at least one of a flexible printed circuit (FPC), a flexible flat conductor (FTC) cable, a flexible printed wiring board (PWB), or a flexible printed circuit board (PCB).

3. An apparatus as in claim 1 wherein the flexible circuit is connected to a first side of the base member and extends to a second opposite side of the base member, wherein the second end of the flexible circuit comprises an electrical connection, and wherein the electrical connection is configured for providing voltages and driving the display module.

4. An apparatus as in claim 1 wherein the display module further comprises an organic light emitting diode (OLED) display structure and a top member, wherein the OLED display structure is on the base member, and wherein the top member is over the OLED display structure.

5. An apparatus as in claim 1 wherein the display module further comprises a conductive cushion surrounding the emissive component.

6. An apparatus as in claim 1 wherein the emissive component is a power supply.

7. An apparatus as in claim 1 wherein the flexible circuit comprises a first side and an opposite second side, wherein the first side and the second side each extend between the first end and the second end, wherein the first side of the flexible circuit is at the base member, wherein the emissive component is mounted on the second side of the flexible circuit, and wherein the second end of the flexible circuit extends beyond the emissive component.

8. An apparatus comprising:
a base member having a first side and an opposite second side, wherein the first side is configured to support a display structure;
an emissive component proximate the second side of the base member, wherein the emissive component is an electrically emissive electrical component;
a flexible circuit extending between the base member and the emissive component, wherein the emissive component is mounted on the flexible circuit, wherein the flexible circuit comprises a first end and an opposite second end, wherein the first end of the flexible circuit is electrically connected to a component of the display structure, and wherein the second end of the flexible circuit is configured to be electrically connected to a portion of the apparatus separate from the display structure; and
a conductive cushion surrounding the emissive component, wherein the conductive cushion is connected to the flexible circuit, and wherein the emissive component is spaced from light emissive components of the display structure.

9. An apparatus as in claim 8 wherein the first side of the base member is configured to support an organic light emitting diode (OLED) display structure.

10. An apparatus as in claim 8 wherein the emissive component further comprises a plurality of electrically emissive components.

11. An apparatus as in claim 8 wherein the emissive component is connected to the flexible circuit.

12. An apparatus as in claim 8 wherein the base member is an organic light emitting diode (OLED) glass member.

13. An apparatus as in claim 6 wherein the apparatus further comprises a top glass member on the base member, wherein the top glass member is configured to capsulate the display structure.

14. An apparatus as in claim 8 wherein the apparatus further comprises a metallic surface between the base member and the emissive component.

15. An apparatus as in claim 8 wherein the emissive component is an electrically emissive component, and wherein the flexible circuit is configured to shield electrical emissions from the electrically emissive electrical component.

16. An apparatus as in claim 8 wherein the conductive cushion comprises a substantially compressible material, and wherein the conductive cushion is configured to shield radio frequency (RF) related emissions from the emissive component.

17. An apparatus as in claim 8 wherein the light emissive components are configured to emit light viewable on a display screen.

18. An apparatus as in claim 8 wherein the emissive component comprises a plurality of emissive components, wherein the conductive cushion is configured to completely surround lateral sides of the plurality of emissive components, wherein the conductive cushion is mounted on the flexible circuit at a first end of the conductive cushion, and a second opposite end of the conductive cushion is at another different member of the apparatus.

19. A method comprising:
providing a base member having a first side and an opposite second side, wherein the first side is configured to support a display structure;
providing an emissive component proximate the second side of the base member, wherein the emissive component is spaced from user viewable light emitting components of the display structure;
connecting a flexible circuit between the base member and the emissive component, wherein the emissive component is mounted on the flexible circuit, wherein the flexible circuit comprises a first end and an opposite second end, wherein the first end of the flexible circuit is electrically connected to a component of the display structure, and wherein the second end of the flexible circuit is configured to be electrically connected to a portion of the apparatus separate from the display structure; and
connecting a conductive cushion to the flexible circuit, wherein the conductive cushion forms a surrounding wall around the emissive component, and wherein the emissive component is an electrically emissive electrical component.

20. A method as in claim 19 wherein the providing of the base member further comprises providing a display module base member having a first side and an opposite second side, wherein the first side is configured to support an organic light emitting diode (OLED) display structure.

* * * * *